United States Patent [19]

Wallace et al.

[11] Patent Number: 5,083,077

[45] Date of Patent: Jan. 21, 1992

[54] BRUSHLESS DOUBLY-FED GENERATION SYSTEM FOR VEHICLES

[75] Inventors: Alan Wallace; René Spée, both of Corvallis, Oreg.

[73] Assignee: The State of Oregon Acting by and through the State Board of Higher Education on Behalf of Oregon State University, Eugene, Oreg.

[21] Appl. No.: 560,188

[22] Filed: Jul. 31, 1990

[51] Int. Cl.$^5$ .............................................. H02P 9/00
[52] U.S. Cl. ........................................ 322/32; 322/4; 318/729
[58] Field of Search ............... 310/68 D; 322/4, 15, 322/32, 44, 29; 318/731, 732, 766, 729

[56] References Cited

U.S. PATENT DOCUMENTS

| | | | |
|---|---|---|---|
| 3,617,838 | 11/1971 | Brandt | 318/225 R |
| 3,781,616 | 12/1973 | Mokrytzki et al. | 318/230 |
| 3,975,646 | 8/1976 | Kilgore et al. | 307/21 |
| 4,001,666 | 1/1977 | Grenfell | 322/4 |
| 4,039,909 | 8/1977 | Baker | 318/197 |
| 4,070,605 | 1/1978 | Hoeppner | 318/227 |
| 4,096,557 | 6/1978 | Schwarz | 363/9 |
| 4,132,931 | 1/1979 | Okuyama et al. | 318/732 |
| 4,227,136 | 10/1980 | Roesel, Jr. | 318/701 |
| 4,249,120 | 2/1981 | Earle | 318/729 |
| 4,277,735 | 7/1981 | Okuyama et al. | 318/766 |
| 4,344,025 | 8/1982 | Okuyama et al. | 318/729 |
| 4,392,099 | 7/1983 | Kuniyoshi | 318/797 |
| 4,401,938 | 8/1983 | Cronin | 322/29 |
| 4,426,611 | 1/1984 | Espelage et al. | 318/803 |
| 4,445,081 | 4/1984 | Kalman et al. | 318/832 |
| 4,455,522 | 6/1984 | Lipo | 318/809 |
| 4,476,424 | 10/1984 | Kalman | 318/832 |
| 4,503,377 | 3/1985 | Kitsbayashi et al. | 318/807 |
| 4,517,467 | 5/1985 | Führing | 290/44 |
| 4,672,298 | 6/1987 | Rohatyn | 323/208 |
| 4,694,189 | 9/1987 | Haraguchi et al. | 290/40 C |
| 4,701,691 | 10/1987 | Nickoladze | 322/32 |
| 4,710,692 | 12/1987 | Libert et al. | 318/729 |
| 4,723,104 | 2/1988 | Rohatyn | 318/813 |
| 4,723,202 | 2/1988 | Kalman | 318/813 |
| 4,743,777 | 5/1988 | Shilling et al. | 322/29 X |
| 4,757,240 | 7/1988 | Mizobuchi et al. | 318/52 |
| 4,791,309 | 12/1988 | Payne et al. | 290/40 |
| 4,794,316 | 12/1988 | Uchino et al. | 322/47 |
| 4,806,781 | 2/1989 | Hochstetter | 290/43 |
| 4,816,696 | 3/1989 | Sakayori et al. | 290/52 |
| 4,862,009 | 8/1989 | King | 290/22 |
| 4,982,147 | 1/1991 | Lauw | 318/729 |
| 4,994,684 | 2/1991 | Lauw et al. | 318/800 X |
| 5,028,804 | 7/1991 | Lauw | 322/32 X |

OTHER PUBLICATIONS

J. L. Hunt, "A New Type of Induction Motor," Proc IEE, vol. 39, pp. 648–667, 1907.

(List continued on next page.)

Primary Examiner—Steven L. Stephan
Assistant Examiner—Kristine Peckman
Attorney, Agent, or Firm—Klarquist, Sparkman, Campbell, Leigh & Whinston

[57] ABSTRACT

An onboard power generation system for use on board a vehicle, such as a passenger car, includes a brushless doubly-fed generator. The generator has a rotor with rotor conductors and a stator with stator windings, the stator windings comprising first and second polyphase stator systems. The generator rotor is mechanically coupled to and driven by the vehicle engine with a driving force to produce an AC power output from the first polyphase stator system. The generation system has a rectifier which receives and rectifies the generator first polyphase stator system AC power output into DC power for delivery to a DC bus of the generator power system. A sensor senses a parameter of the AC power output received by the rectifier and produces a sensor signal in response thereto. A converter receives the sensor signal, and in response thereto, converts power received from an excitation power source into excitation power for the generator second polyphase stator system. The converter operates to produce a controlled flow of AC power output from the first polyphase stator system of the generator regardless of variations of the driving force of the vehicle engine. A method is also provided of generating DC power on board a vehicle using the above-described generation system.

30 Claims, 8 Drawing Sheets

F. Creedy, "Some Developments in Multi-Speed Cascade Induction Motors," Proc IEEE, vol. 59, pp. 511–532, 1921.

A. R. W. Broadway and L. Burbridge, "Self-Cascaded Machine: A Low-Speed Motor or High-Frequency Brushless Alternator," Proc IEE, vol. 117, No. 7, pp. 1277–1290, Jul. 1970.

A. Kusko and C. B. Somuah, "Speed Control of a Single-Frame Cascade Induction Motor with Slip-Power Pump Back," IEEE Transactions on Industrial Applications, vol. IA-14, No. 2, pp. 97–105, 1978.

H. K. Lauw, "Characteristics of the Doubly-Fed Machine in a Hydro Variable-Speed Generation System," Final Report, USDOE Bonneville Power Administration Contract No. 79-85BP24332, Jun. 1986.

H. K. Lauw, "Variable-Speed Generation with the Series-Resonant Converter," Final Report, USDOE Bonneville Power Administration Contract No. 79-85BP24332 Mod-1, Jan. 1987.

Power Technologies, Inc., "Variable Rotor Speed for Wind Turbines: Objectives and Issues," EPRI AP-4261, Sep., 1985.

M. Ohi and J. C. Kaskian, "Dynamic Characteristics and Speed Feedback Stabilization of the Doubly Fed Machine," IEEE Paper A76 413-5, Power Engineering Society, Portland, Oregon, 1976.

K. Oguchi and H. Suzuki, "Speed Control of a Brushless Static Kramer System," IEEE Transactions on Industry Applications, vol. IA-17, No. 1, Jan./Feb. 1981, pp. 22–27.

BRUSHLESS DOUBLY-FED GENERATION SYSTEM FOR VEHICLES

BACKGROUND OF THE INVENTION

The present system relates generally to a system for use on board a vehicle to supply the needs of the vehicle, and more particularly to an improved vehicle generation system having a brushless doubly-fed generator.

Other vehicle generator or alternator systems have been incorporated into vehicles to supply the electrical requirements of the vehicle and to supplement and recharge a DC battery on board the vehicle. For vehicles propelled by engines, typically the alternator rotor is coupled to and driven by the engine via linking means, such as an endless belt. The electrical output of the alternator is alternating current (AC) power which is generally converted to direct current (DC) power by a rectifier. The DC power is supplied via a DC bus to a variety of onboard electrical devices and to a DC battery for storage on board the vehicle.

For example, in the automotive industry, DC brush-type generators were used in cars until the early 1960's. The brush-type generators suffered from a variety of commutation problems which severely restricted the reliability of the automobile's power generation system. Since that time, the automotive industry has used and continually improved a claw pole Lundell-type alternator.

The Lundell alternator includes a rotor having a single coil embedded therein which, upon rotation, establishes a multipolar bidirectional field. The voltage produced by the Lundell alternator is regulated by controlling the current flow within the rotor coil. However, the magnetic field of the Lundell alternator must pass axially through the magnetic core and the shaft so that the output power may only be increased by increasing the rotor diameter and thus the overall size of the alternator.

Furthermore, eddy current losses in the rotor are increased due to the solid nature of the pole segments facing the air gap. The rotor eddy currents increase the temperature of the field coil which reduces the overall efficiency and output capability of the alternator. Further contributing to the losses of the Lundell alternator are the brushes required to transfer current from a regulator to the rotor coils.

In sum, typical automobile generators have losses resulting in efficiencies of 60% or less. Additionally, the requirement of brushes detracts from the overall reliability of a generator, limits the generator maximum speed, and increases the maintenance costs of the power generation system.

The onboard power generation requirements in the automotive field are continually increasing, particularly in the luxury car field. The vehicles of today typically have more than 40 motors, solenoids and actuators, such as the starter motor, power windows, blowers, seat and mirror adjusters, wipers and washers, and door and trunk locks, all of which are powered by the onboard power generation system. Many of today's cars have microprocessor-controlled fuel and ignition systems incorporating additional motors, actuators and solenoids, and which require a reliable power source to promote a fast response and precise control of these systems and devices. The automotive industry is also looking toward new electrically powered systems on board a vehicle, such as electric steering and braking, active suspension systems, heated windshields and electric air conditioning. It has been estimated that by the year 2000 the electric power consumption on board automobiles will be approximately three to five kilowatts.

In the face of these increasing automotive power generation requirements, it appears that the Lundell-type alternator may be nearing the end of its useful life in automotive applications. A single Lundell alternator would have to be significantly increased in size over the types conventionally used today to meet these increased power requirements. Alternatively, two Lundell alternators could be used on board, but would decrease the overall efficiency of the engine, decrease fuel economy and/or require a larger engine. Furthermore, the underhood space constraints of today's automobiles render both the larger Lundell alternator and the dual Lundell alternator system to be impractical alternatives to meet these increasing power needs.

A permanent magnet machine or an induction machine could be used as an automotive alternator, but each is far more costly than a Lundell-type alternator. For example, the permanent magnet machines require expensive exotic core materials. Furthermore, permanent magnet alternators and induction alternators each require costly controllers to provide suitable power for use in an automotive generation system.

Thus, a need exists for an improved power generation system for use on board vehicles, such as the luxury automobiles of the near future, which is not susceptible to the above limitations and disadvantages.

SUMMARY OF THE INVENTION

It is an overall object of the present invention to provide an improved power generation system for use on board vehicles.

A further object of the present invention is to provide an improved onboard vehicle power generation system which optimizes the use of a brushless doubly-fed generator.

An additional object of the present invention is to provide a power generation system for vehicles which is more efficient than other known systems.

A further object of the present invention is to provide a vehicle power generation system having a brushless doubly-fed generator which operates at a better power factor than other known vehicle power generators.

Yet another object of the present invention is to provide a vehicle power generation system which is flexible in operation and cost effective to operate.

Another object of the present invention is to provide a vehicle power generation system having a lower rated converter than those of other known systems.

Still another object of the present invention is to provide a vehicle generation system which is lower in initial cost than other known systems.

Yet another object of the present invention is to provide a vehicle generation system capable of operating efficiently in a synchronous mode, as well as maintaining operation in an induction mode if synchronism is lost, such as in the event of a converter failure.

A further object of the present invention is to provide a vehicle generation system having a brushless doubly-fed generator which is durable and robust.

Still a further object of the present invention is to provide a power generation system for vehicles which is reliable, particularly for given high speed operation requirements, and easy to maintain.

According to one aspect of the present invention, a generation system is provided for use on board a vehicle having a DC bus and propulsion means for propelling the vehicle. The generation system includes a brushless doubly-fed generator which has a rotor with rotor conductors and a stator with stator windings. The stator windings include first and second polyphase stator systems. The rotor is mechanically coupled to and driven by the propulsion means with a driving force. The generation system also includes rectification means electrically interconnected with the first polyphase stator system of the generator. The rectification means are provided for rectifying an AC power output received from the first polyphase stator system into DC power for delivery to the DC bus. The generation system has first sensor means for sensing a parameter of the AC power received by the rectification means from the first polyphase stator system of the generator. The first sensor means produces a first sensor signal in response to the sensed AC power output parameter. Second sensor means senses an additional parameter of the generation system, such as the engine speed or the rectified DC current, and in response thereto produces a second sensor signal. Third sensor means senses a parameter of the DC power rectified by the rectification means, and produces a DC power sensor signal in response to the sensed DC power parameter. The generation system has converter means which receives the first and second sensor signals and the DC power sensor signal from the first, second and third sensor means, respectively, and in response thereto, converts power received from an excitation power source into excitation power. The converter means deliver the converted excitation power to the generator second polyphase stator system. The excitation power is converted by the converter means according to the sensor signals so as to produce a controlled flow of the AC power output from the first polyphase stator system of the generation system substantially regardless of variations in the driving force of the propulsion means.

In an illustrated embodiment, the excitation power source is the DC bus so that the power received by the converter means is DC power. Alternatively, for a vehicle having a DC battery connected to the DC bus, the excitation power source is the DC battery. The AC output of the generator second stator system may serve as the excitation power source when the system includes an AC to AC converter or a separate excitation power source rectifier. In the illustrated embodiment, the rotor of the brushless doubly-fed generator is a nested cage rotor. Furthermore, the converter means includes a regulating invertor, and the rectification means includes an uncontrolled rectifier.

According to another aspect of the present invention, a method of generating DC power on board a vehicle comprises the steps of providing a power generation system on board the vehicle, including a brushless doubly-fed generator, rectification means, sensor means and converter means, which each may be as described above. The method further includes the steps of driving the generator rotor with a driving force produced by the vehicle propulsion means to produce an AC power output in the first polyphase stator system of the generator. In a sensing step, a parameter of the AC power output from the first polyphase stator system of the generator is sensed with the sensor means, and a sensor signal is produced in response to the sensed AC power output. In a receiving step, power is received from an excitation power source with the converter means. In another receiving step, the sensor signal from the sensor means is received with the converter means. In a converting step, power received from the excitation power source is converted into excitation power with the converter means according to the received sensor signal so as to control the flow of the AC power output from the first polyphase stator system substantially regardless of variations in the driving force of the vehicle propulsion means. In a delivering step, the converted excitation power is delivered to the second polyphase stator system of the generator. In a rectifying step, the AC power output received from the first polyphase stator system is rectified into DC power with the rectification means for delivery to the DC bus.

Recent advances in the fields of power electronics and their associated control systems have brought a renewed interest in the brushless doubly-fed generator as a viable component in a variable speed generation system. Furthermore, prior to the inventors' own work, the inventors are unaware of any system for modeling the dynamic characteristics of a single shaft brushless doubly-fed generator which do not include a host of markedly untrue simplifying assumptions, such as assuming an ideal sinusoidal winding disposition. Such a dynamically applicable model is necessary to investigate detailed design alternatives for both the generator and converter components.

The present invention relates to the above features and objects individually as well as collectively. These and other objects, features and advantages of the present invention will become apparent to those skilled in the art from the following description and drawings.

DETAILED DESCRIPTION OF A PREFERRED EMBODIMENT

Figure 1:
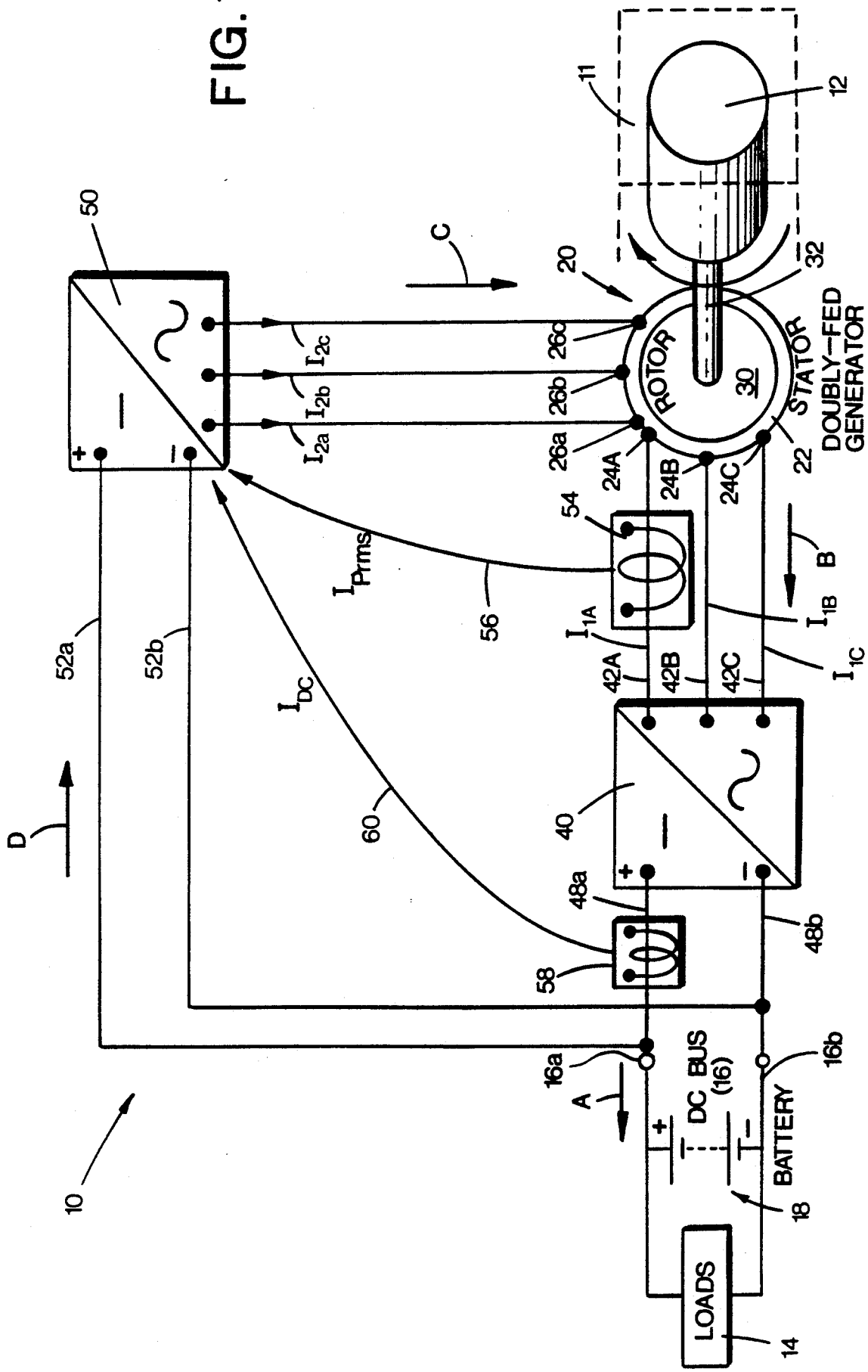
FIG. 1 is a partially schematic block diagram of one form of a power generation system for vehicles of the present invention.

FIG. 1 illustrates an embodiment of a power generation system or generator system 10 constructed in accordance with the present invention which may be used on board a vehicle 11, such as a car or truck (not shown). The vehicle 11 has propulsion means, such as an engine 12, for propelling the vehicle. Typically, the vehicle 11 has a variety of devices and accessories (see Background section above for examples) which are driven by motors, solenoids and actuators, indicated collectively as "loads" 14 in FIG. 1. The loads 14 receive power as indicated by arrow A from a direct current (DC) bus 16 having positive and negative feed components 16a and 16b. The vehicle 11 typically has onboard energy storage means, such as a DC battery 18, for chemically storing electrical energy therein.

The Brushless Doubly-fed Generator

Figure 2A:
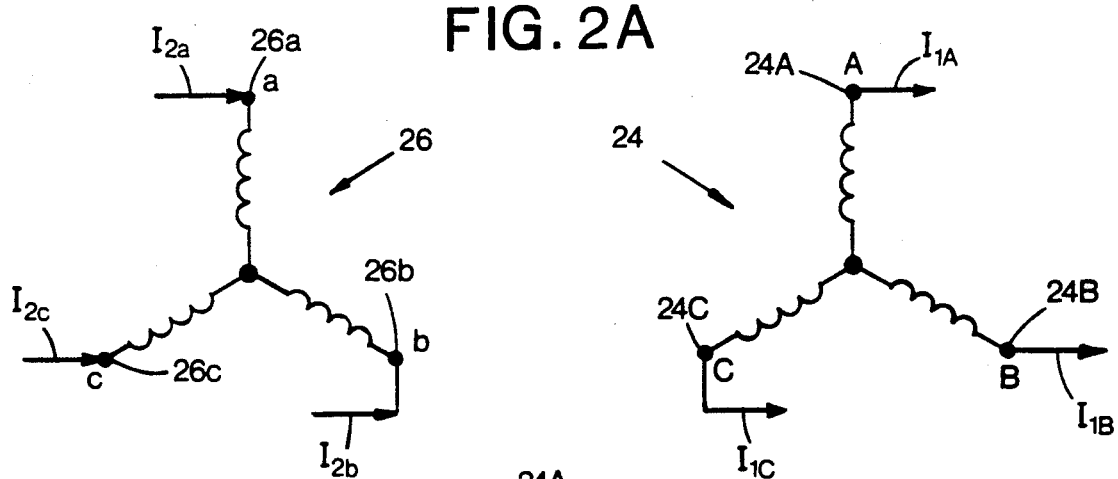
FIGS. 2A, 2B and 2C are schematic circuit diagrams, each of one form of an alternate embodiment of a brushless doubly-fed generator stator assembly of the present invention.
Figure 2B:
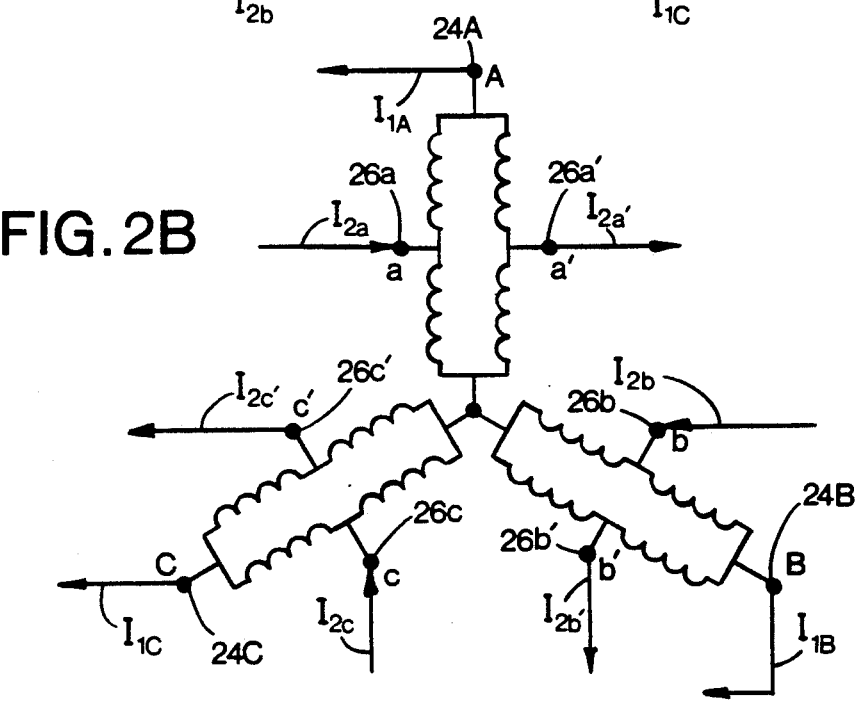
Figure 2C:
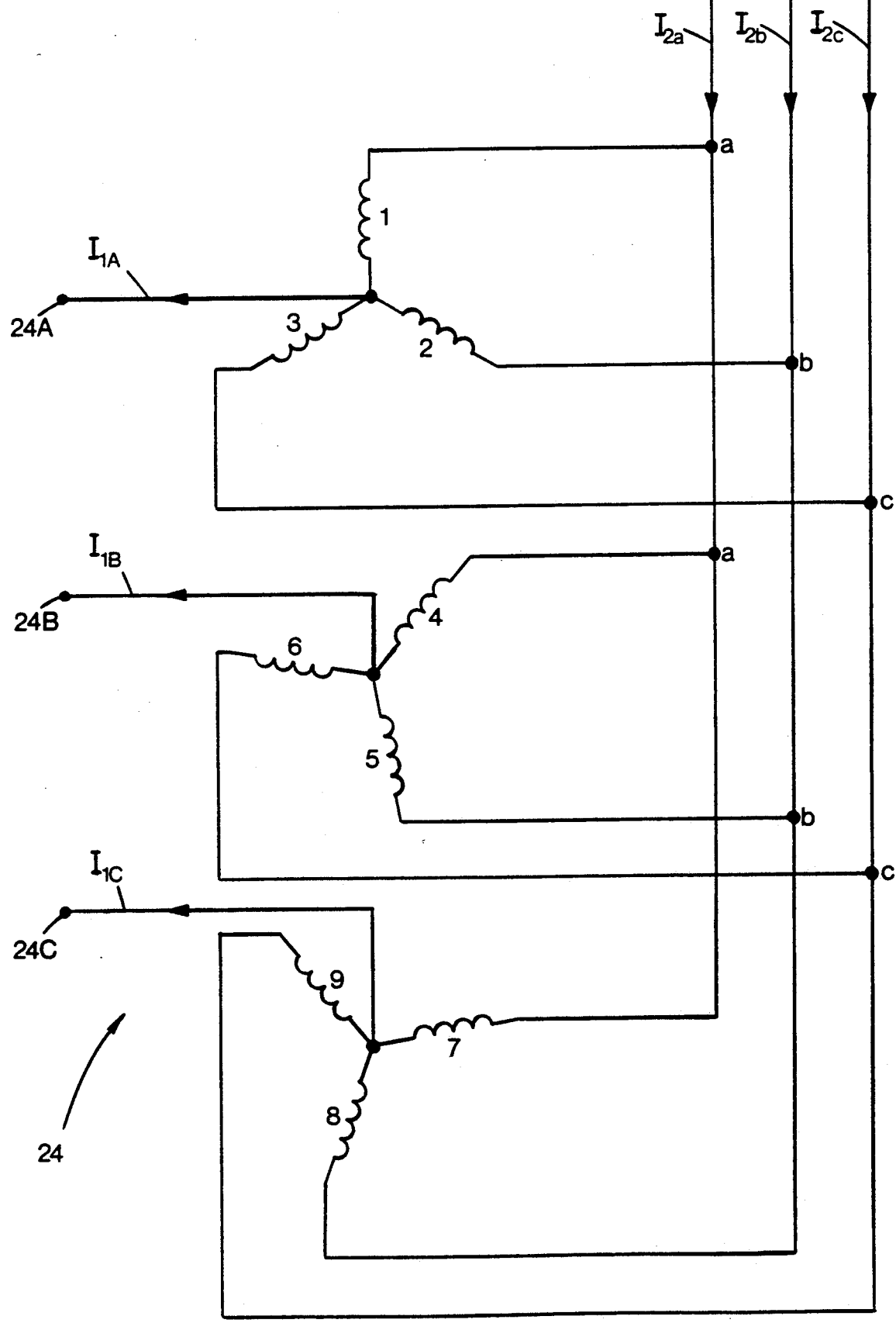

Referring also to FIGS. 2 and 3, the vehicle generation system 10 includes a brushless doubly-fed generator 20. The generator 20 has a stator unit or stator 22 with stator windings shown schematically as the outer circle of the generator in FIG. 1. The stator windings comprise first and second polyphase stator systems 24 and 26 which may be physically separate windings (FIG. 2A) on the stator 22. Alternatively, the first and second stator systems 24 and 26 may share common windings as illustrated in FIGS. 2B and 2C. Therefore, the system and method of the present invention may use either separate or common stator windings for the first and second stator systems 24 and 26. Furthermore, FIGS. 1, 2A, 2B and 2C illustrate a 3-phase system embodiment, although it is apparent that the generator 20 may be designed for implementation with systems having other numbers of phases, such as a two-phase system.

For example, the first stator system 24 of generator 20 comprises a six-pole winding system (FIGS. 2A and 2C) or a four-pole winding system (FIG. 2B) having first stator terminals 24A, 24B and 24C for producing an AC power output indicated by arrow B in FIG. 1. Therefore, the first stator system 24 comprises the generator power windings, with the first stator terminals 24A, 24B and 24C referred to as the power side of generator 20. The rms (root mean square) value of current in the power windings 24 is designated as $I_P$, and the rms voltage as $V_P$.

The second stator system 26 comprises a two-pole winding system having second stator terminals 26a, 26b and 26c for receiving excitation power indicated by arrow C. Thus, the second stator system 26 comprises the generator control windings, with second stator terminals 26a, 26b and 26c referred to as the excitation, converter or control side of generator 20. The rms value of current in the control windings 26 is designated as $I_C$, and the rms voltage as $V_{CC}$.

The term "pole" refers to a magnetic pole of the electric machine, such as a north pole or a south pole, and a "pole pair" comprises two oppositely polarized poles. The pole pairs for the first stator system 24 is designated $p_P$ and is illustrated as three pole pairs. The pole pairs for the second stator system 26 is designated $p_C$ and is illustrated as one pole pair.

The number of poles for each stator winding system is chosen so the first stator system 24 has more poles than the second stator system 26. For example, the power windings 24 may have at least twice the number of poles as the control windings 26. By having the difference between the number of poles be at least four, unbalanced magnetic pole conditions in the generator are avoided. Thus, an alternate embodiment may comprise first and second stator systems having eight and two poles, respectively. With the second stator system 26 having the lesser number of poles, the torque distribution is lower on the excitation or converter side of the machine. However, in some applications, for example in the automotive industry where components typically have a "value engineered" history, some imbalance in the magnetic poles may be tolerated without experiencing a significant decrease in performance or a noticeable increase in acoustic noise.

The generator 20 has a brushless rotor unit or rotor 30, shown schematically in FIG. 1 as the inner circle of the generator 20. A squirrel-cage type rotor is preferred because it is more robust and more economical to manufacture than a wound rotor. The rotor 30 has a shaft 32 which is mechanically coupled to and driven by the vehicle engine 2. The rotor 30 has a rotor conductor system 34 comprising rotor conductors 35 mounted thereon.

In FIGS. 3B through 3E and FIG. 4, various embodiments of a linearly developed section of rotor 30 comprising a squirrel-cage type rotor are illustrated. The rotor conductors 35 may include a plurality of rotor bars 36. The rotor conductors 35 may also have at least one conductor loop 38 positioned between adjacent rotor bars 36. A nested conductor loop group 39 may be positioned between adjacent rotor bars 36 comprising the loops 38 being nested within one another. In some applications, the rotor conductor system 34 may only include nested groups 39 of the conductor loops 38, with the rotor bars 36 omitted as in FIG. 3E. A theoretical generator design strategy, including discussions of various designs for the stator 22 and rotor 30, are discussed further below.

The Uncontrolled Rectifier

The generator first stator system output terminals 24A, 24B and 24C are coupled to the DC bus 16 by rectification means, such as a rectifier 40, which may be an uncontrolled rectifier. Thus, expensive thyristors or other controlled gating components having full load current capacity are not required to rectify the polyphase power received from generator 20 into DC power for the DC bus.

Figure 5:
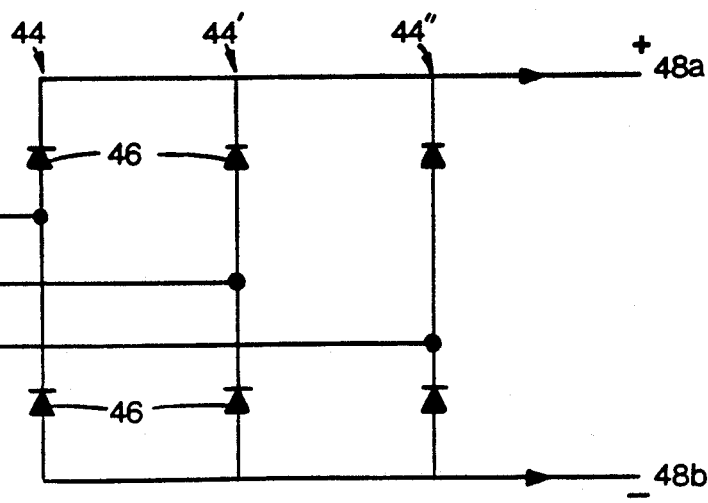
FIG. 5 is a schematic circuit diagram of one form of rectification means of the present invention.

For example, the uncontrolled rectifier 40 may be a three phase, bridge rectifier as shown in FIG. 5. The rectifier 40 has input lines 42A, 42B and 42C coupled to the respective first stator system output terminals 24A, 24B and 24C. Three bridges, 44, 44' and 44" each having two diodes, such as diode 46, rectify the AC power from generator 20 into a DC power output. The rectified DC power has positive and negative components 48a and 48b. The rectifier DC power output components 48a and 48b are coupled to and received by the DC bus positive and negative buses 16a and 16b to deliver the rectified power to the loads 14.

The Converter

The generation system 10 has regulating or controlling converter means, such as converter 50, which may be a controlled inverter, such as a resonant converter or a pulse width modulation (PWM) inverter. The converter 50 receives power from an excitation power source as indicated by arrow D, which may be a separate battery supply (not shown), or an additional rectifier (see 104 in FIG. 7, below) tapping a portion of the first stator system output power at terminals 24A, 24B and 24C. In the illustrated embodiment of FIG. 1, the DC bus 16 serves as the excitation power source. Specifically, a portion of the rectified DC power output 48a and 48b from rectifier 40 is tapped as converter DC input power, having positive and negative components 52a and 52b.

The generation system 10 also has sensor means for monitoring, sensing and scaling a parameter of the generation system, and for producing a sensor signal in response thereto. The scaling function of the sensor means, if required, may be performed by the particular sensor employed, or separate and discrete scaling means, such as an amplifier (not shown), may be used to scale the sensor signal as desired for a particular application. The sensor means includes first sensor means, such as sensor 54 in FIG. 1, for monitoring and sensing a parameter of the AC power output received by rectifier 40 from the generator first stator system 24. In the illustrated embodiment, the sensed AC power output parameter is the rms value of the output current $I_P$ of the generator power windings 24. The rms current sensor 54 may be any type of conventional rms current sensor or transducer, a variety of which are well known to those skilled in the art.

Sensor 54 is illustrated schematically as sensing the rms current in the line interconnecting terminals 24A and 42A. However, the output current $I_P$ may also be measured in the line interconnecting terminals 24B and 42B, or 24C and 42C, or a combination of these lines. The sensor 54 produces a first feedback signal or rms output current sensor signal 56 in response to the sensed AC power output parameter $I_P$.

The generation system 10 sensor means also has second sensor means, such as sensor 58 in FIG. 1, for monitoring and sensing a parameter of the generation system 10, such as the DC power output rectified by rectifier 40. In the illustrated embodiment, the DC power output parameter sensed is the positive rectified DC current 48a or $I_{DC}$. The current sensor 54 may be any type of conventional DC current sensor or transducer, a variety of which are well known to those skilled in the art. The sensor 58 produces a second feedback signal or rectified current sensor signal 60 in response to $I_{DC}$.

The converter 50 has first comparator means, such as current comparator 62, for receiving and comparing the first and second feedback signals. Here, the current comparator 62 compares the rms output current sensor signal 56 with the rectified current sensor signal 60. From a comparison of these two signals, the current comparator 62 produces a first difference signal, such as current difference signal 64. Thus, the current difference signal 64 represents the difference between the positive component of rectified DC current 48a, or $I_{DC}$, and the rms value of the generator output current $I_P$.

The current difference signal 64 is used to select the control frequency $f_C$ of the control windings 26. The signal 64 is limited by first limiting means, such as frequency limiter 66. For example, with a nominal control frequency $f_C$ of 30 Hz, limiter 66 limits signal 64 within a tolerance, such as 30 or 60 Hz. The limiter 66 produces a first logic control signal, such as frequency adjustment signal 68.

The converter 50 also includes second reference means, such as means for establishing a desired voltage reference level, such as voltage reference 70. The voltage reference 70 receives a DC bus voltage reference signal 72 from the negative DC power input 52b. Using the DC bus voltage reference signal 72 as a baseline, the voltage reference 70 produces a voltage reference signal 74, also indicated as $V_{REF}$. In the illustrated embodiment, for a vehicle having a nominal 12 volt rating for the DC bus 16, the voltage reference signal $V_{REF}$ is approximately 15 volts DC.

The converter 50 has second comparator means, such as a voltage comparator 76. The voltage comparator 76 receives a second feedback signal comprising a parameter of the DC power rectified by the rectifier 40. Preferably, the DC power parameter is the DC voltage on bus 16. In the illustrated embodiment, the converter 50 monitors the voltage of the DC bus at the positive DC power input 52A by providing a DC bus voltage feedback signal 78 to comparator 76. The voltage comparator 66 compares the voltage reference signal 74 ($V_{REF}$) with the feedback signal 78 to produce a second difference signal, such as voltage difference signal 80.

The voltage difference signal 80 is limited by second limiting means, such as voltage limiter 82. For example, for the rated 12 volt system, the voltage limiter 82 limits the voltage difference signal 80 beyond a approximate plus or minus two volt DC deadband tolerance around a nominal 15 volt DC value. The voltage limiter 82 produces a second logic control signal, such as a modulation index signal 84 for use with a pulse width modulation inverter serving as converter 50.

The first and second logic control signals, comprising the frequency adjustment signal 68 and the modulation index signal 84 are received by a logic stage 86. The logic stage 86 produces a plurality of switching control signals, such as control signal 88, which drive a power switching stage 90, such as a pulse width modulation (PWM) inverter. The power switching stage 90 receives the positive and negative DC input power components 52a and 52b and acts as an inverter to convert the DC power into AC excitation power. In the illustrated embodiment, the AC excitation or control power has three phase current components, such as $I_{2a}$, $I_{2b}$ and $I_{2c}$ at an excitation frequency of $\omega_C$. The three phase excitation or control power is received by the control winding terminals 26a, 26b and 26c from the converter 50.

In one embodiment of converter 50, the power switching stage 90 comprises a conventional thyristor bridge (not shown). The logic stage 86 comprises conventional thyristor gating logic which produces switching control signals comprising a plurality of gate signals, such as signal 88.

In an alternate embodiment of converter 50, the power switching stage 90 comprises a conventional transistor bridge (not shown), which may use MOSFET's, IGBT's (isolated gate bipolar transistors) or similar devices. The logic stage 86 comprises conventional transistor base drive signal generation logic (not shown) which produces a plurality of base drive signals, such as 88.

Figure 7:
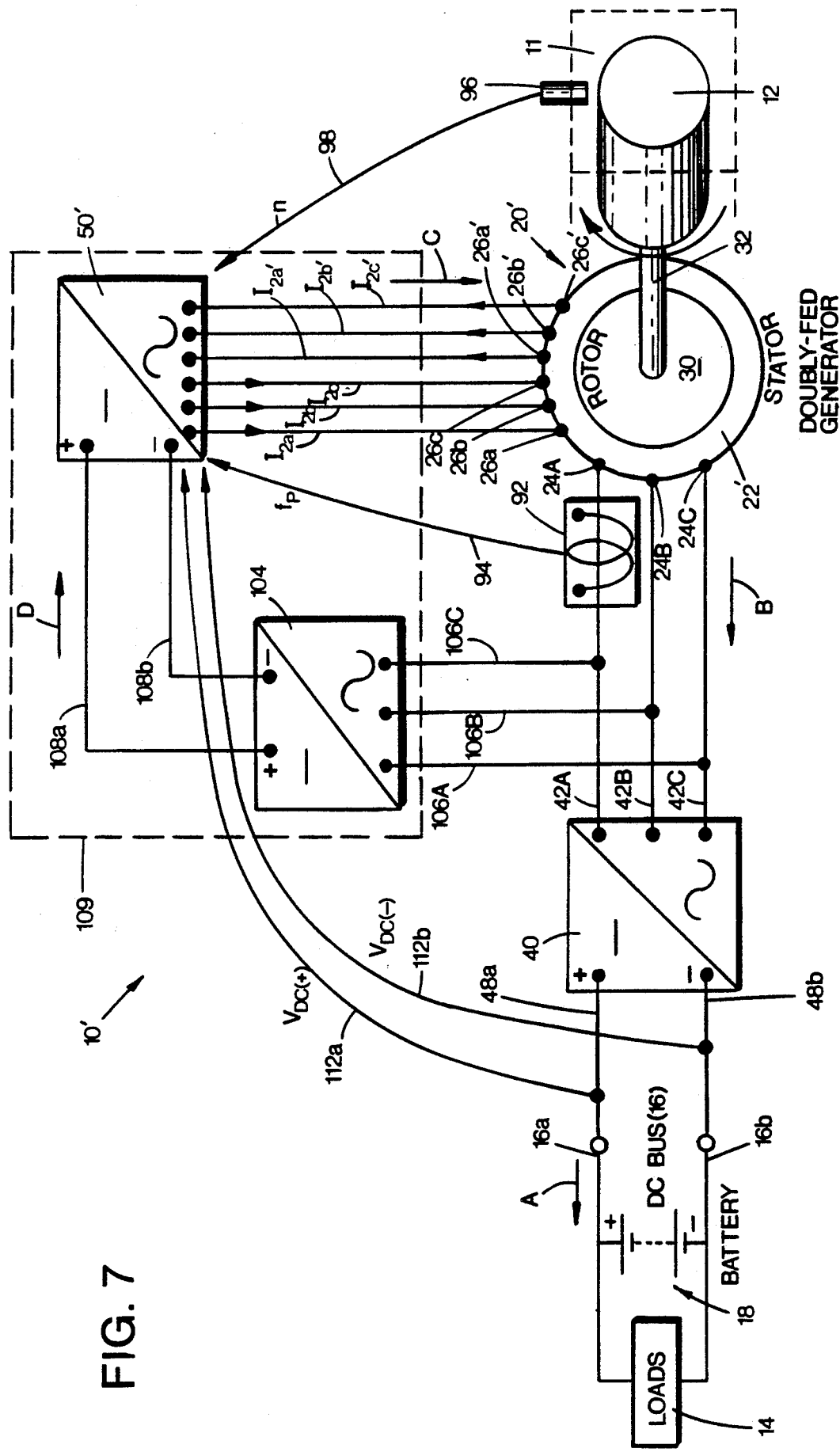
FIG. 7 is a partially schematic block diagram of an alternate form of a power generation system for vehicles of the present invention.
Figure 8:
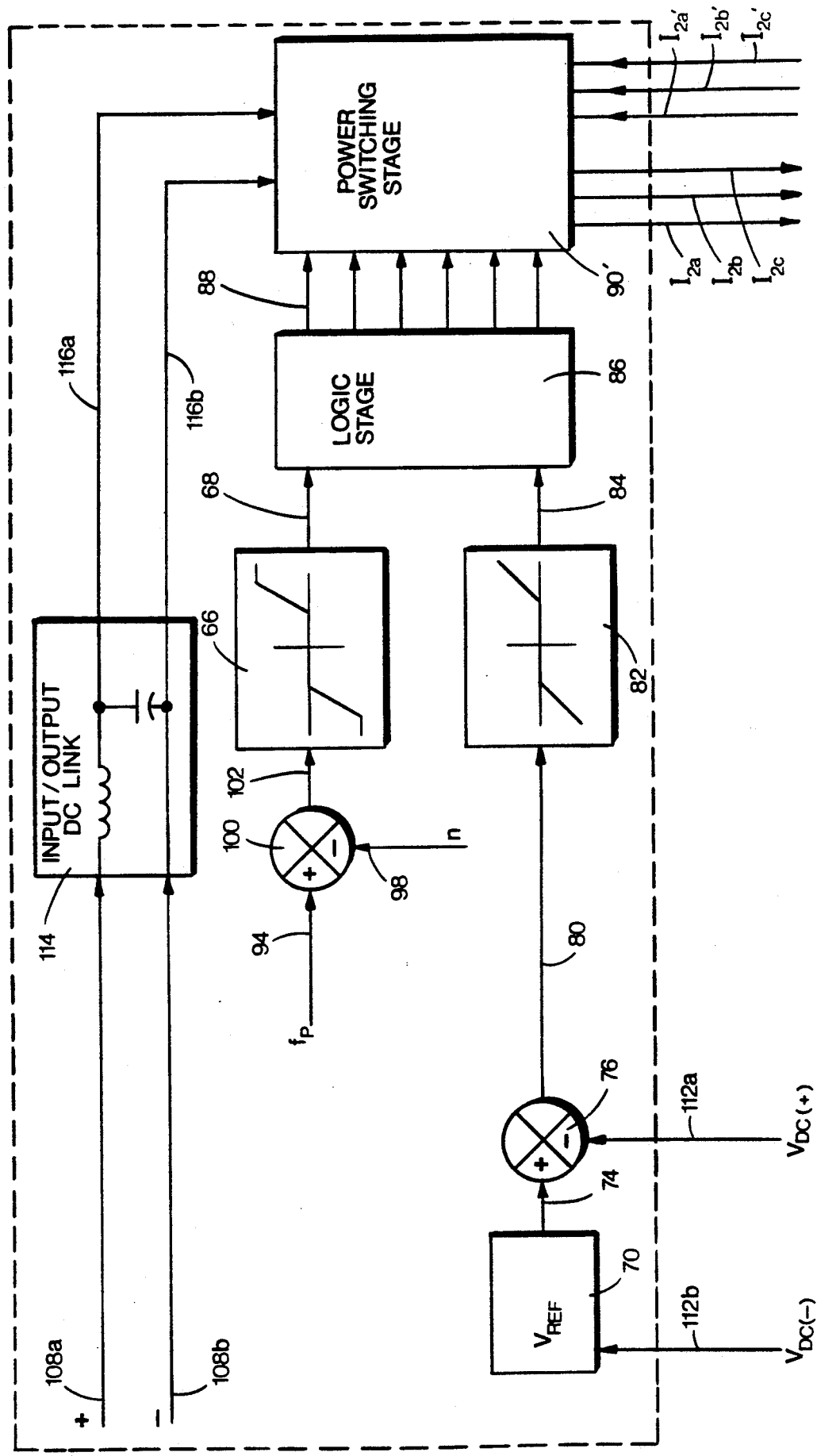
FIG. 8 is a partially schematic block diagram of an alternate form of converter means of the present invention.

In FIGS. 7 and 8, an alternate embodiment of a converter 50' is shown which may be used with either of the above described switching stages 90 having a conventional thyristor bridge or a conventional transistor bridge. The converter 50' selects the control frequency $f_C$ in a manner different from that illustrated for converter 50. FIG. 7 illustrates a generation system 10' having a converter 50' and alternate first and second feedback or sensor means. The first sensor means comprises a frequency feedback sensor 92 for sensing the frequency $f_P$ of the power output from the first stator system 24. The frequency sensor 92 produces a power winding frequency feedback signal 94 representing $f_P$.

The generation system 10' includes second sensor means, such as a speed feedback sensor 96 for monitoring and sensing the speed of the engine 12 or of the rotor shaft 32. The engine or rotor speed sensor 96 produces a second feedback signal, such as a speed feedback signal 98 which may represent the engine speed n or the rotor frequency $\omega_R$. The rotor speed sensor 96 detects the speed of the engine 12 by monitoring either the electrical pulses to the fuel injectors or to the distributor of engine 12.

Referring now to FIG. 8, converter 50' has a first comparator means, such as frequency comparator 100. The frequency comparator 100 receives and compares the first and second feedback signals 94 and 98. From a comparison of these two signals, the frequency comparator 100 produces a first difference signal, such as a frequency difference signal 102 Thus, the frequency difference signal 102 represents the difference between the generator output power frequency $f_P$ and the engine speed n. The frequency difference signal 102 is used to select the control frequency $f_C$ of the generator control windings 26. The signal 102 is limited by the frequency limiter 66, in the same manner as described above with reference to FIG. 6.

FIGS. 7 and 8 also illustrate an alternate excitation power source comprising excitation power source rectification means, such as an excitation power source rectifier 104. The rectifier 104 receives a portion of the generator output power as a three phase tapped power input 106A, 106B and 106C from lines coupled to the generator output terminals 24A, 24B and 24C, respectively. The rectifier 104 may be as illustrated in FIG. 5, to produce a rectified DC input to converter 50' having positive and negative components 108a and 108b. The excitation power source rectifier 104 is shown as a separate and discrete component from the converter 50'. However, it is apparent that rectifier 104 and converter 50 or 50' may be functionally combined within a common housing and supplied as a single device, such as an AC to AC converter 109.

When the excitation power source is other than the DC bus illustrated in FIG. 1 (such as the excitation power source rectifier 104 or a separate battery), the converter 50 requires separate inputs of the DC bus voltage positive and negative components. The positive and negative voltages of the DC bus 16a and 16b are monitored by signals 112a and 112b, respectively. Signal 112a represents the DC bus positive voltage $V_{DC}(+)$, and signal 112b represents the DC bus negative voltage $V_{DC}(-)$.

The desired voltage reference level 70 receives the DC bus voltage negative component signal 112b and operates as described above with reference to FIG. 6. The voltage comparator 76 receives the DC bus voltage positive component signal 112a, and operates as described above for FIG. 6.

The converter 50' of FIG. 8 may also include optional DC link means, such as an input/output link 114, for transmitting the DC power received from the excitation power source rectifier 104 to the power switching stage 90'. Alternatively the link 1 4 be incorporated into may the AC to AC converter 109. The input/output link 114 may be a DC filter comprising a series inductor and a parallel capacitor. The filtered output of the DC link 114 has positive and negative components 116a and 116b which are received by the power switching stage 90'.

The balance of the components illustrated for converter 50' may be the same as those described above for converter 50. Similarly, the balance of components and their functions for the generation system 10' shown in FIG. 7 may be the same as those described with reference to FIG. 1 for the generation system 10.

Stator Design

A lower torque distribution on the converter side, resulting from the second stator system 26 having the lesser number of poles, advantageously allows the converter 50 to have a lower rating than a converter connected on the power side of a generator. A lower rated converter is more economical to manufacture because the components may also have lower ratings, that is, a lesser current-carrying capacity. This feature allows the generation system 10 to be economically attractive where other previous systems were cost-prohibitive because the converter had to have the same rating as the generator.

FIG. 2A illustrates the first and second stator systems 24, 26 as having isolated stator windings, with each coil of the stator windings carrying a single current component. Each winding system has a desired number of poles, with the control windings 26 having $2p_C$ poles and the power windings 24 having $2p_P$ poles.

FIGS. 2B and 2C illustrate the first and second stator systems 24, 26 as having common shared stator windings. Each coil of the stator windings carries two current components, one for supply to the uncontrolled rectifier 40 and the other received from converter 50.

FIG. 2B shows a two/four pole system, having 2-pole control windings 26 and 4-pole power windings 24, and is shown embodied in brushless doubly-fed generator 20' in FIG. 7. This two/four pole system requires a return path for the return control winding currents $I_{2a'}$, $I_{2b'}$ and $I_{2c'}$ to an alternate power switching stage 90', shown within converter 50'.

FIG. 2C shows a two/six pole system, having 2pole control windings 26 and 6-pole power windings 24. However, the isolated winding configuration of FIG. 2A may be preferred to construct a two/six pole system.

Generally for shared windings, such as shown in FIGS. 2B and 2C, the current components of the first and second stator system flowing within a given coil have different frequencies which flow in the different paths of the same coil. The frequency of current flowing in the power windings 24 is designated $f_P$, and the frequency of current flowing in the control windings 26 is $f_C$. Separating the frequencies of these two current components is accomplished by satisfying two conditions.

First, the stator windings are distributed in stator slots to eliminate mutual coupling between the two current components. This condition results from selecting a different number of poles for the first and second stator systems.

Second, the phase windings must be balanced, that is, of equal impedance to prevent the flow of neutral currents from one 3-phase system into the other 3-phase system. This is illustrated in FIGS. 2B and 2C as three parallel sets of 3-phase systems. For example, in FIG. 2C the orientation of the coils depicts a spatial angle of the mutual magnetic coupling between the magnetic axes of the indicated coils as being 40 degrees. That is, 40 degrees is the relative displacement between winding set 1-2-3 and set 4-5-6, and between sets 4-5-6 and 7-8-9.

Such a balanced design also advantageously prevents other undesirable side effects, such as torque pulsations caused by negative sequence currents.

As required by the first condition above, FIG. 2C illustrates the slot distribution of the windings to prevent mutual coupling of the two current components and to separate the frequencies of the two current components $f_P$ and $f_C$. In arranging the stator windings within stator 22, the pole-pitch may correspond with either the 6-pole system or the 2-pole system or a compromise thereof.

Rotor Design

The rotor 30 may be designed on the basis of the following theory. Assuming the first stator system 24 produces a first rotating stator field rotating in a first direction, and the second stator system 26 produces a second rotating stator field rotating in an opposite direction. For the squirrel-cage rotor 30 having a number of bars 36 equal to L, or in the absence of rotor bars has a number of nested conductor loop groups 39 equal to L, the first rotating stator field produces a main slot harmonic h (relative to the rotor) of:

$$h = p_C - L.$$

For a brushless doubly-fed generator 20 having a negative main slot harmonic h, the harmonic field rotates in a direction opposite to that of the first rotating stator field.

To produce the rotating field required for the second stator system 26, which also rotates opposite to the first rotating stator field, the main slot harmonic h is equal to the negative of the number of pole pairs of the second stator system ($h = -p_C$). Solving for L, the number of squirrel-cage rotor bars 36, or in the absence of rotor bars, the number of nested conductor loop groups 39, is the sum of the number of pole pairs for the first and second stator systems. For example, $$L = p_P + p_C = 3 + 1 = 4,$$

for a two/six pole stator system having a first stator system 24 with three pole pairs $p_P$, and a second stator system 26 with one pole pair $p_C$.

Figure 3A:
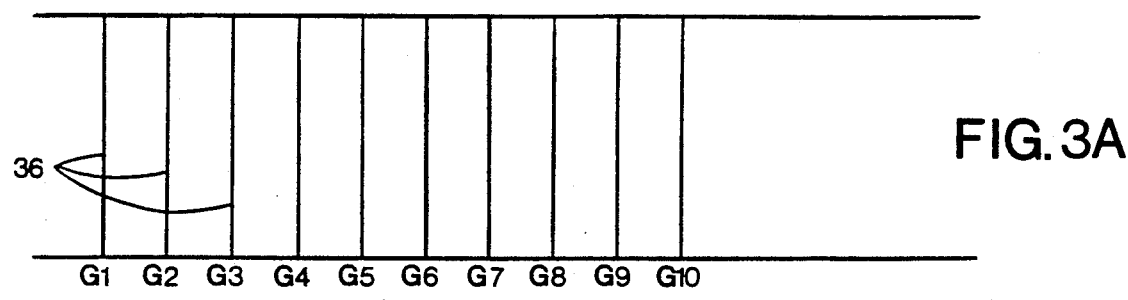
FIG. 3A, 3B and 3C are schematic diagrams of a section of a squirrel cage rotor, with FIG. 3A illustrating a conventional induction machine rotor, and FIGS. 3B through 3E each illustrating one form of an alternate embodiment of a brushless doubly-fed generator rotor of the present invention.

While in the above example, the rotor conductor system 34 may comprise only four rotor bars 36, nested conductor loop groups 39 spaced between adjacent rotor bars enhance the generator performance by reducing rotor leakage reactance and undesirable harmonics. For reference, FIG. 3A shows one section of a conventional squirrel-cage rotor having a plurality of rotor bars 36 for use in a conventional induction machine. The nested coils 38 of the present invention may be inserted in the surplus slots between the illustrated four rotor bars 36.

Figure 3B:
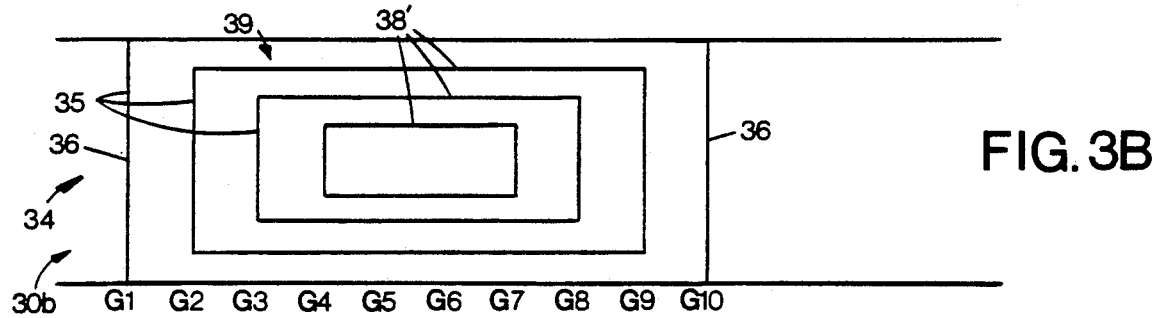
Figure 3C:
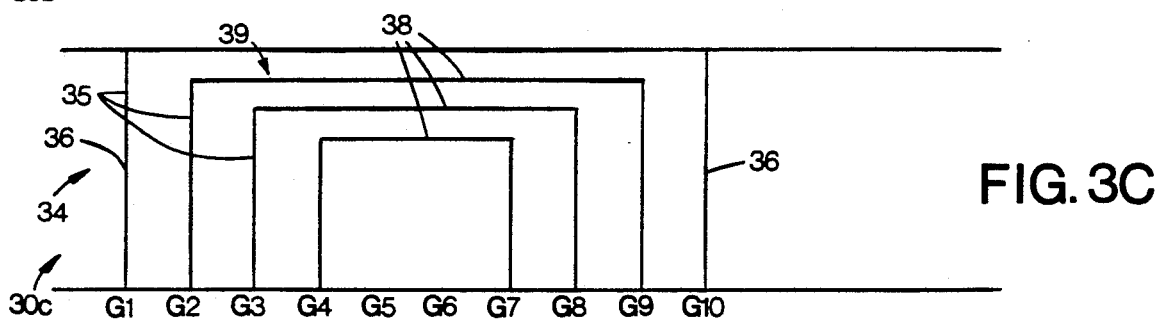

FIGS. 3B through 3E illustrate alternative embodiments of a section of a squirrel-cage rotor, designated 30b through 30e respectively, for the brushless doubly-fed generator 20 of the present invention. In the embodiments of FIGS. 3B and 3C, a number of shorted coils 38 are equally spaced between two adjacent rotor bars 36. In FIG. 3B, the slots numbered G1 and G10 are used for the rotor bars 36. Slots G2 through G9 may be filled with three nested shorted coils 38', with the G5 and G6 locations left empty. Alternatively, slots G5 and G6 may simply not be provided.

FIG. 3C illustrates a simplified version of the rotor of FIG. 3B. This simplified rotor may be retrofit from a conventional induction machine squirrel-cage rotor, such as shown in FIG. 3A. One of the end rings is removed and U-shaped coils 38 are formed by shorting together the appropriate rotor bars. In FIG. 3C, slots G5 and G6 are left unoccupied, and a nested group 39 of three nested loops 38 is formed by shorting together the bars in slots G2–G9, G3–G8, and G4–G7.

Figure 4:
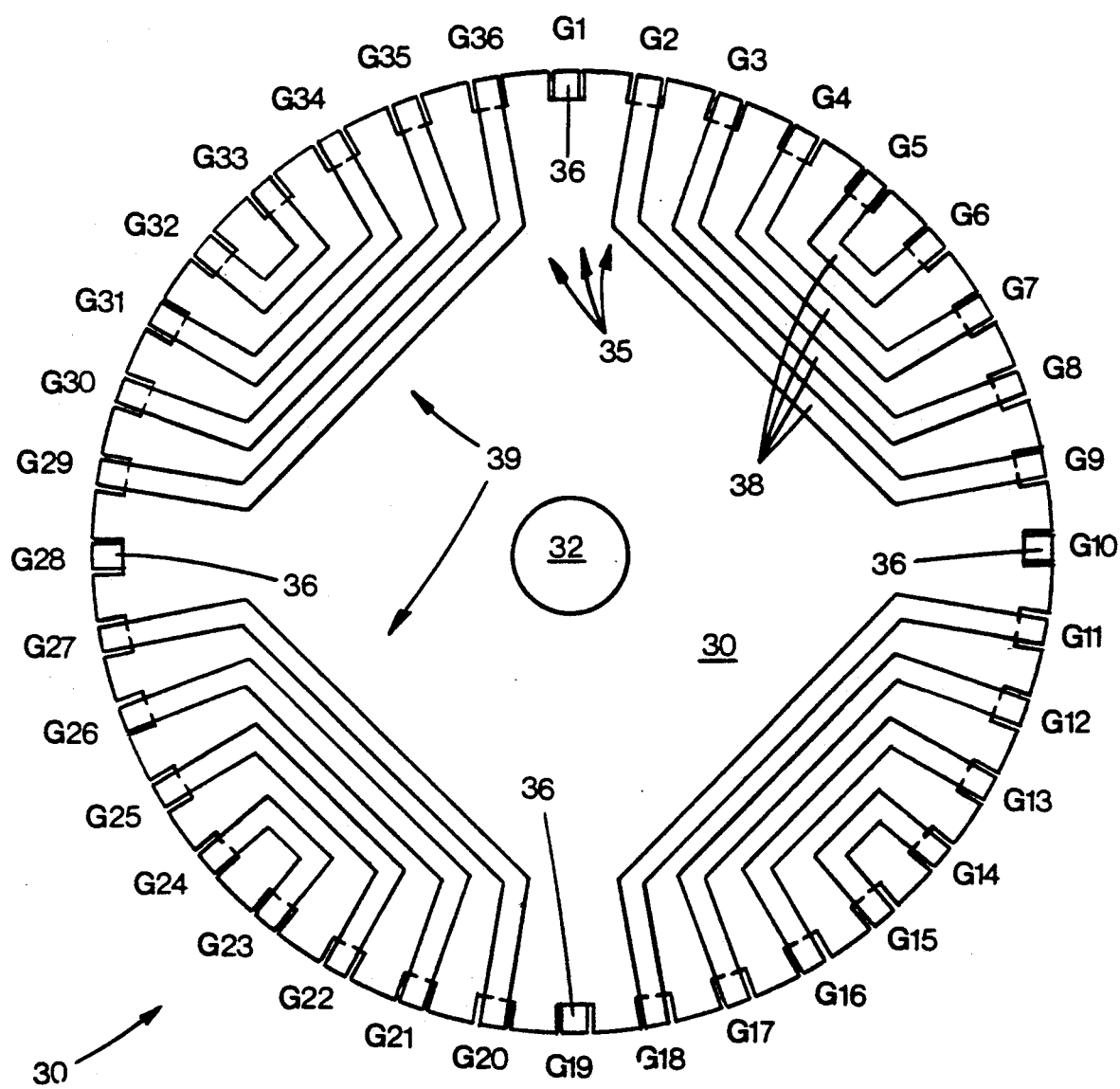
FIG. 4 is an unscaled schematic end view of one form of a rotor of the brushless doubly-fed machine of the present invention.

In FIG. 4, a 36-slot squirrel-cage rotor 30 having sequentially numbered slots G1 through G36, has four rotor bars 36 spread evenly over the rotor periphery, such as in slots numbered G1, G10, G19, and G28. Four nested conductor loop groups 39 may be placed in the slots remaining between the rotor bars 36. For example, a nested group 39 having four concentric shorted rotor coils 38 may be placed between any two bars, with no slot being left unoccupied, such as between the bars in slots G1 and G10, the four shorted rotor coils occupy slots G2–G9, G3–G8, G4–G7, and G5–G6.

Figure 3D:
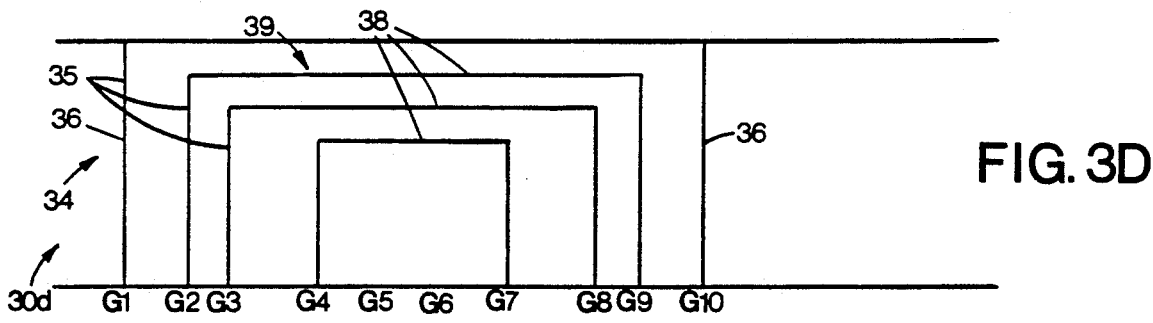

More effective generator performance may be obtained by concentrating the placement of the rotor loops 38 at the same span as the placement of the first stator system 24 windings. In this configuration, the rotor slots would be unevenly spaced about the rotor periphery. For example, in a two/six pole stator winding system, the six poles of the power winding are located 60 degrees apart about the 360 degree circumference of the stator 22. This yields a 60 degree power winding pole span. FIG. 3D illustrates a rotor 30d having four rotor bars 36, with one bar in slot G1 located 90 degrees from an adjacent bar in slot G10. The conductor loop 38 in slots G2–G9 is spaced close to the conductor loop in slots G3–G8 at locations which span approximately 60 degrees. Thus, the rotor conductors are concentrated to enhance the performance of a two/six pole generator 20.

Figure 3E:
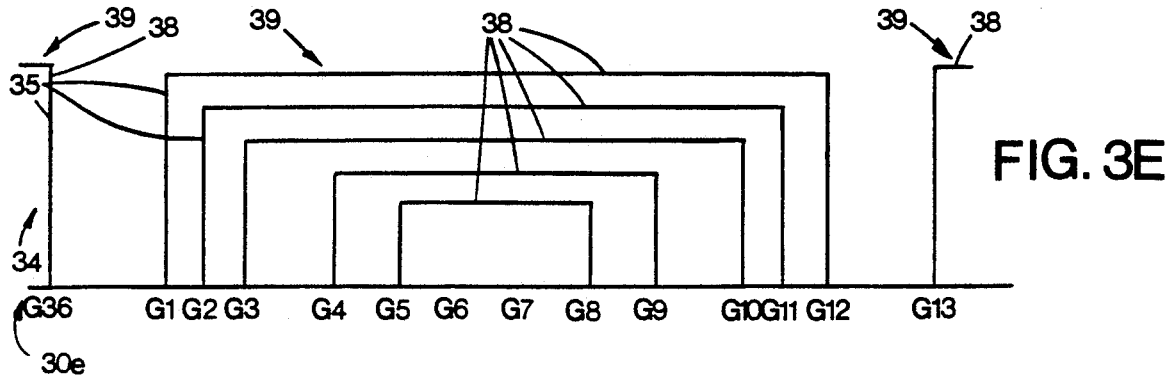

FIG. 3E shows a rotor 30e for a two/four pole generator 20. The rotor 30e is constructed without rotor bars 36, so the number of nested conductor loop groups 39, is:

$$L = p_P + p_C = 2 + 1 = 3.$$

The span of the four poles of the power windings about the 360 degree circumference of the stator 22 is 90 degrees. Therefore, the rotor conductors are concentrated about a 90 degree span on the rotor periphery by clustering the conductor loops 38 in slots G1–G12 and G3–G10 about the loop in slots G2–G11, which spans 90 degrees. There are no slots provided at locations corresponding to slots G6 and G7 on an evenly spaced 36-slot rotor.

Design Example

A strategy for designing the brushless doubly-fed generator 20 and for controlling the generator in a generation system 10 will be discussed with respect to a generation system for a passenger car or light truck. The engine 12 of a passenger car or light truck operates over a wide speed range, with different power levels or ratings being required from the generation system 10 over the speed range. Over this wide speed range, three values of the vehicle engine speed (hereinafter "n") are of interest:

$n_i$ = minimum or idle engine speed;
$n_k$ = nominal or cruise speed;
$n_m$ = maximum or top speed.

While the engine speed is usually given in units of revolutions per minute, for the purposes of discussion these engine speeds will be in terms of revolutions per second (rev/sec). For example, a typical idle speed is 10 rev/sec with a typical maximum speed of 90 rev/sec and a highway cruise design speed of 50 rev/sec.

At rated power, the rectifier 40 produces a current I in amperes at a voltage V in volts to develop a rated maximum power VI in watts. The maximum rectifier power output VI is the peak DC output power which may be generated over a wide frequency range of AC output power received from the brushless doubly-fed generator 20. For a vehicle power system having a nominal 12 volt rating, the rectifier output voltage is rated at 15 volts DC, and for the illustrated converter 50, the rectifier output voltage may vary by approximately plus or minus two volts DC.

With the above engine speeds and voltage rating for a generation system 10 being given, several design variables may be selected based upon the particular vehicle application. For example, the mechanical pulley ratio may be selected to determine the speed of the brushless doubly-fed generator 20 when the rotor shaft 12 is connected to the vehicle engine 12 by an endless belt. The ratio of the pulley size on the engine shaft to the pulley size on the generator shaft 32 is:

$$a = D_E/D_G$$

where:
$D_E$ = the engine pulley diameter; and
$D_G$ = the generator rotor shaft pulley diameter.

Hence, for any engine speed n, such that ($n_i \leq n \leq n_m$), the brushless doubly-fed generator rotor speed, N, is determined by: N=an rev/sec.

The frequency, current and voltage output of the generator power windings 24 which have supplied to rectifier 40 are related to the mechanical speed and control frequency of the control windings 26 according to:

$$\alpha\, n = N = (f_P - f_C)/(p_P + p_C).$$

As n, the engine speed, varies over the speed range of engine 12, the power winding frequency $f_P$ varies, with low values such as 200 Hz at the engine idle speed $n_i$ and up to 1,000 Hz at the engine maximum speed $n_m$. The control frequency $f_C$ of the control windings 26 then varies inversely with the generator rotor speed N (or with $\alpha$ n). Therefore, the control frequency $f_C$ is the smallest or lowest value at the maximum engine speed ($\alpha\, n_m$). At the maximum engine speed, the control frequency is much less than the frequency of the power windings, i.e., $f_C \ll f_{Pm}$. Therefore, by simplifying the above equations at this condition, an indication of the sum of the pole pairs may be obtained from:

$$p_P + p_C = f_{Pm}/(\alpha\, n_m).$$

The pulley ratio $\alpha$ may be selected as a non-integer value so that the sum of the pole pairs ($p_P + p_C$) is a realistic value. For example, the number of pole pairs of the control winding should be less than the number of pole pairs for the power winding and the pole pairs should not be equal, e.g., $p_C = 1, 2, 3$, etc., and $p_P = 3, 5$, etc.

At low engine speeds, corresponding to low generator rotor speeds ($\alpha\, n_i$), the power frequency $f_{Pi}$ in the power windings 24 is also lower than at other speeds. In contrast, the control frequency of the control windings 26 is at a maximum value of $f_{Ci}$. The maximum control frequency $f_{Ci}$ is also significantly lower than the power winding frequency $f_{Pi}$, such that:

$$\alpha\, n_i = (f_{Pi} + f_{Ci})/(p_P + p_C).$$

Typically, at engine idle the maximum control frequency $f_C$ may be 20-25% of the power winding frequency at idle speed ($f_{Pi}$). Thus, one function of the converter 50 is to change the frequency $f_C$ of the control winding currents $I_{2a}$, $I_{2b}$ and $I_{2c}$.

The power winding 24 output voltage and current $V_P$ and $I_P$ are related to the control winding 26 voltage and current $V_C$ and $I_C$ according to:

$$V_P = I_C[(X_{MP} X_{MC})/(r_R/s_1 + jX_R)] - I_P[(r_P + jX_P) - ((X_{MP})^2/(r_R \cdot s_1 + jX_R))]$$

and $$V_C S = I_C[(r_C/S) + (jX_C) + ((X_{MC})^2/(r_R/s_1 + jX_R))] - I_P[(X_{MP} X_{MC})/(r_R/s_1 + jX_R)]$$

where:
$V_P$ and $I_P$ are the output voltage and current of power winding 24;
$V_C$ and $I_C$ are the voltage and current input to control winding 26 received from converter 50;
$r_P$, $r_C$ and $r_R$ are the effective resistances of the power winding 24, control winding 26, and rotor conductor system 34, respectively, referred to the power winding side 24;
$X_P$, $X_C$ and $X_R$ are the reactances of the power windings 24, control windings 26 and rotor conductor system 34, respectively, referred to the power winding side;
$X_{MP}$ and $X_{MC}$ are the mutual reactances of the power winding 24 to the rotor conductor system 34, and of the control winding 26 to the rotor conductor system 34, respectively;

$$S = f_C/f_P, \text{ and}$$

$$s_1 = (N - f_C)/f_P.$$

System Operation

The operation of the generating system 10 will be discussed with reference to a method of generating DC power on board a vehicle 11 having a DC bus 16 and propulsion means, such as engine 12, for propelling the vehicle. The method includes the step of providing on board the vehicle 11 a power generation system 10 including a brushless doubly-fed generator 20, rectification means 40, optional excitation source rectifier means 104, sensor means, such as 54, 58, 92, 96, 108a and 108b in various combinations, and converter means 50, each of which may be as described above. The generator rotor 30 is mechanically coupled to the engine 12. The engine 12 drives rotor 30 with a driving force to produce an AC power output in the first polyphase stator system 24.

Figure 6:
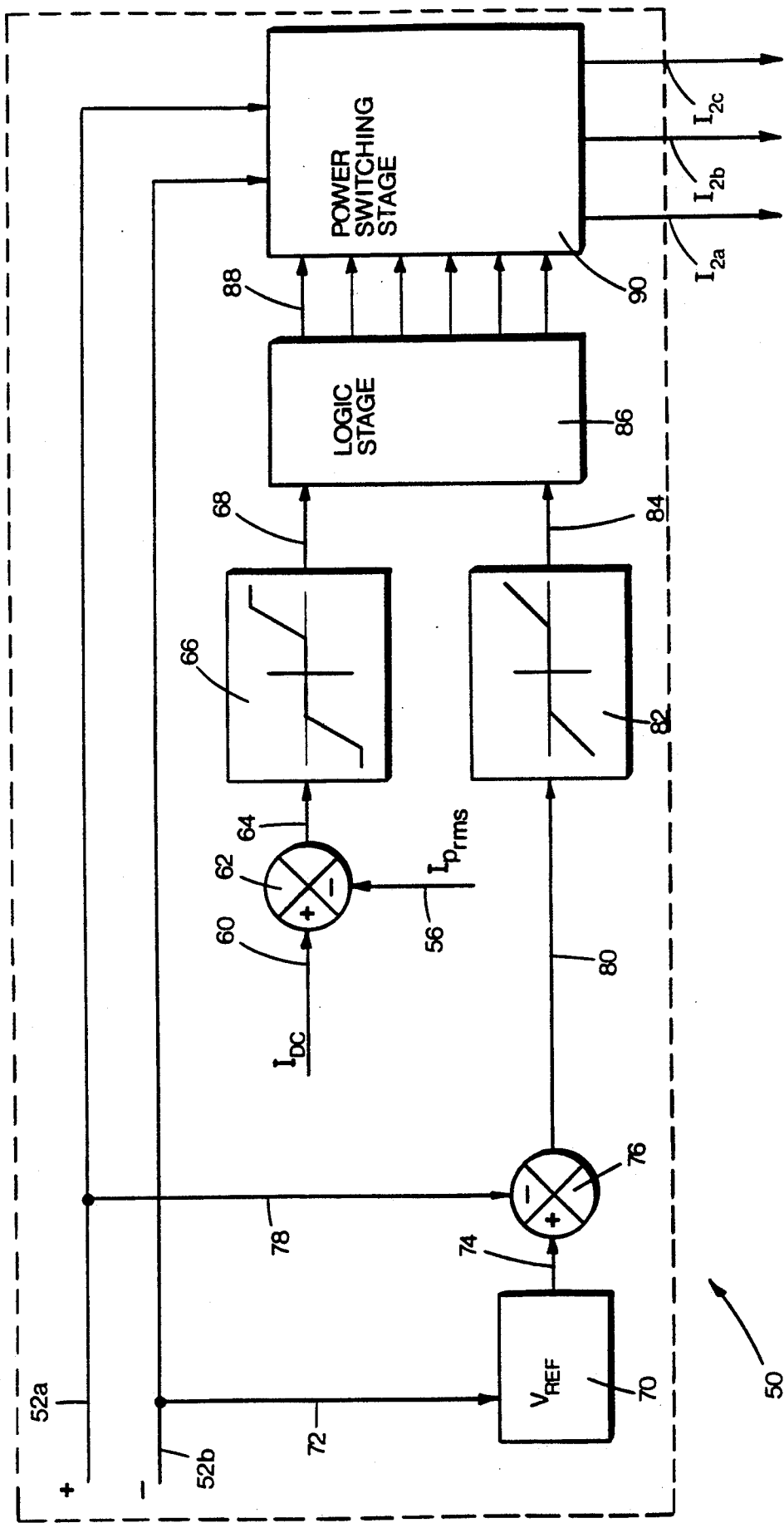
FIG. 6 is a partially schematic block diagram of one form of converter means of the present invention.

A parameter of the AC power output of the generator first polyphase stator system 24 is sensed by sensor means which produce a first feedback sensor signal in response to the sensed AC power output parameter. In the embodiment of FIGS. 1 and 6, the sensor 54 senses the rms current $I_{Prms}$, and in response thereto, produces a generator current output feedback sensor signal 56. A parameter of the DC power produced by the rectifier 40 is sensed by sensor means which produce a second feedback sensor signal in response to the sensed DC power output parameter. In FIGS. 1 and 6, the current sensor 58 senses the DC current $I_{DC}$, and in response thereto, produces a rectifier current output feedback sensor signal 60.

The converter 50 receives and compares the generator current output feedback sensor signal 56 with the rectifier current output feedback sensor signal 60 using comparator 62. The comparator 62 produces a current difference signal 64 in response to this comparison.

In the embodiment of FIGS. 7 and 8, a frequency sensor 92 senses the AC power output frequency $f_P$ of the generator first polyphase stator system 24, and produces in response thereto a first feedback signal comprising a generator frequency output signal 94. An engine speed sensor 96 senses the speed of engine 12, or may alternatively sense the speed of the rotor shaft 32. In response to the sensed speed, the sensor 96 produces a second feedback signal comprising the engine or rotor shaft speed sensor signal 98.

The converter 50' receives and compares the generator frequency output signal 94 with the speed sensor signal 98 using comparator 62. The comparator 62 produces a current difference signal 64 in response to this comparison.

In the embodiment of FIGS. 1 and 6, the converter 50 receives power from the excitation power source, here the DC bus 16, as positive and negative converter DC input power components 52a and 52b. The converter means 50 senses a component of the DC power produced by the rectifier 40, such as the voltage of the positive and negative components of the DC bus 52a and 52b, as positive and negative signals 72 and 78, respectively. A desired reference voltage level 70 (15 volts approximately) is added to the negative of the DC bus to produce the voltage reference signal 74 or $V_{REF}$. The voltage comparator 76 receives and compares the positive voltage feedback signal 78 with the voltage reference signal 74 $V_{REF}$, and in response thereto produces voltage difference signal 80.

In the embodiment of FIGS. 7 and 8, the excitation power source comprises the excitation power rectifier 104, or the AC to AC converter 109. Therefore, the output component of the DC power produced by the rectifier 40 is monitored separately as an additional feedback signal to converter 50'. The voltage difference $V_{DC}(+)$ and $V_{DC}(-)$ is monitored and the desired reference level 70 and comparator 76 operate in the same manner as described above for FIG. 6.

The converter 50 or 50' limits the frequency and voltage difference signals 64 and 80 with the respective frequency and voltage limiters 66 and 82 about given deadband tolerances, as mentioned above.

The frequency and voltage limiters 66 and 82 produce respective frequency adjustment and modulation index signals 68 and 84 as input signals to the logic stage 86. The logic stage 86 uses input signals 68 and 84 to produce a plurality of switching control signals, such as 88, to drive the power switching stage 90. The power switching stage 90' of FIG. 8 may be used with stator winding systems having control windings 26 (such as in FIG. 2B) requiring current return paths from terminals 26a', 26b' and 26c'.

In this manner, the DC input power 52a and 52b, or 108a and 108b, is inverted by the power switching stage 90 or 90' into excitation power which is delivered to the second polyphase stator system 26. The converter 50 or 50' operates in such a manner as to produce excitation power in response to a combination of feedback signals which depend upon the chosen embodiment. In this manner, the flow of AC power output from the first polyphase stator system 24 is controlled in response to variations in the driving force of engine 12 and the demands placed by loads 14 upon the DC bus 16.

As a final step in this method of generating DC power on board vehicle 11, AC power received from the first polyphase stator system 24 is rectified by the rectifier 40 into DC power. The rectified DC power having positive and negative components 48a and 48b is delivered to the respective positive and negative buses 16a and 16b, and therefrom to the loads 14 and battery 18.

Having illustrated and described the principles of our invention with respect to a preferred embodiment, it should be apparent to those skilled in the art that our invention may be modified in arrangement and detail without departing from such principles. For example, a variety of other types of rectifiers 40 and converters 50 may be substituted for those described herein.

We claim all such modifications falling within the scope and spirit of the following claims; we claim:

1. A generation system for generating DC power on board a vehicle having a DC bus and propulsion means for propelling the vehicle, the generation system comprising:

a brushless doubly-fed generator having a rotor with rotor conductors and a stator with stator windings, the stator windings comprising first and second polyphase stator systems, the rotor mechanically coupled to and driven by the propulsion means with a driving force to produce an AC power output from the first polyphase stator system;

rectification means electrically coupled with the first polyphase stator system of the generator for rectifying the AC power output received from the first polyphase stator system into DC power for delivery to the DC bus;

sensor means for sensing a parameter of the generation system and for producing a sensor signal in response to the sensed generation system parameter; and converter means responsive to the sensor signal for converting power received from an excitation power source into excitation power which is delivered to the second polyphase stator system, with the excitation power converted by the converter means in response to the sensor signal so as to produce a controlled flow of the AC power output from the first polyphase stator system of the generator substantially disregarding variations in the driving force of the propulsion means.

2. A generation system according to claim 1 wherein the sensor means comprises:

first sensor means for sensing a parameter of the AC power output from the first polyphase stator system of the generator, and for producing a first sensor signal in response to the sensed AC power output parameter;

second sensor means for sensing an additional parameter of the generation system, and for producing a second sensor signal in response to the sensed additional parameter; and third sensor means for sensing a parameter of the DC power rectified by the rectification means, and for producing a DC power sensor signal in response to the sensed DC power parameter; and wherein said converter means receives and processes the first and second sensor signals, and the DC power sensor signal, and in response thereto, said converter means converts power received from the excitation power source into said excitation power.

3. A generation system according to claim 2 wherein the excitation power source is the DC bus and the power received by the converter means from the DC bus is DC power.

4. A generation system according to claim 3 wherein the converter means serves as the third sensor means by monitoring the voltage of the DC bus as the DC power is received from the DC bus by the converter means, and the converter means also maintains a substantially steady level of DC voltage on the DC bus regardless of variations in an electrical load onboard the vehicle supplied by the DC bus.

5. A generation system according to claim 2 wherein:
the generation system further includes tapping means for tapping a portion of the AC power produced by the generator first polyphase stator system to serve as the excitation power source; and
the converter means comprises an AC to AC converter receiving the tapped portion of the AC power from the tapping means.

6. A generation system according to claim 2 wherein the generation system further includes excitation power source rectification means for tapping and rectifying a portion of the AC power produced by the generator first polyphase stator system into DC power to serve as the excitation power source.

7. A generation system according to claim 6 wherein the converter means includes DC link means for transmitting the DC power received from the excitation power source rectification means.

8. A generation system according to claim 2 wherein:
the sensed AC power output parameter sensed by the first sensor means comprises the frequency of the AC power output produced by the first polyphase stator system; and
the additional parameter of the generation system sensed by the a second sensor means comprises the engine speed.

9. A generation system according to claim 2 wherein:
the sensed AC power output parameter sensed by the first sensor means comprises the rms current of the AC power output produced by the first polyphase stator system; and
the additional parameter of the generation system sensed by the a second sensor means comprises the DC current produced by the rectification means.

10. A generation system according to claim 1 wherein the first and second polyphase stator systems have common shared windings, and the first and second polyphase stator systems have a respective first and second number of pole pairs with each pole pair comprising two poles, the first polyphase stator system having at least twice the number of poles as the second polyphase stator system.

11. A generation system according to claim 10 wherein the rotor has a substantially cylindrical peripheral surface, and the rotor conductors comprise plural rotor bars spaced about the peripheral surface of the rotor and at least two rotor conductor loop groups, with each rotor conductor loop group lying between two adjacent rotor bars and comprising at least one rotor conductor loop, with the number of rotor bars being the sum of the first and second number of pole pairs of the respective first and second polyphase stator systems.

12. A generation system according to claim 10 wherein the rotor conductors comprise a number of rotor conductor loop groups equal to the sum of the first and second number of pole pairs, with each rotor conductor loop group comprising at least one rotor conductor loop.

13. A generation system according to claim 10 wherein the rotor has a peripheral surface and the rotor conductors are concentrated about the rotor peripheral surface at a rotor span which approximates the span of the poles of the first polyphase stator system.

14. A generation system for generating DC power on board a vehicle having propulsion means for propelling the vehicle and a DC bus supplying power to an onboard electrical load, the generation system comprising:
a brushless doubly-fed generator having a rotor with rotor conductors and a stator with stator windings, the stator windings comprising first and second polyphase stator systems, the rotor mechanically coupled to and driven by the propulsion means with a driving force to produce an AC power output from the first polyphase stator system;
rectification means electrically coupled with the first polyphase stator system of the generator for rectifying the AC power output received from the first polyphase stator system into DC power for delivery to the DC bus;
converter means for converting power received from an excitation power source into excitation power, the converter means being electrically coupled with the second polyphase stator system of the generator for delivering the excitation power to the second polyphase stator system of the generator; and
feedback means for feeding-back a parameter of the AC power output of the first polyphase stator system as a first feedback signal and a parameter of the DC power rectified by the rectification means as a second feedback signal to the converter means;
wherein the converter means converts the power received from said excitation power source into said excitation power in response to the first and second feedback signals, so as to maintain a substantially steady level of DC voltage on the DC bus substantially disregarding variations in the onboard electrical load and in the driving force of the propulsion means.

15. A generation system according to claim 14 wherein:
the excitation power source is the DC bus;
the power received by the converter means from the DC bus is DC power.

16. A generation system according to claim 15 wherein:
the first feedback signal represents the frequency of the AC power output of the first polyphase stator system;
the feedback means includes means for feeding-back the engine speed as a third feedback signal; and
the converter means compares the first and third feedback signals and converts the power received from the excitation power source into excitation power in response to the comparison of the first and third feedback signals.

17. A generation system according to claim 16 wherein the second feedback signal represents the DC voltage of the DC power rectified by the rectification means.

18. A generation system according to claim 15 wherein:
the first feedback signal represents the rms current of the AC power output of the first polyphase stator system;
the second feedback signal represents the DC current of the DC power rectified by the rectification means; and
the converter means monitors the DC voltage of the DC power received from the DC bus and converts the power received from the DC bus into said excitation power in response to the monitored DC voltage and the first and second feedback signals.

19. A generation system according to claim 14 wherein:
the generation system further includes excitation power source rectification means for tapping and rectifying a portion of the AC power produced by the generator first polyphase stator system into DC power; and
the excitation power source is the excitation power source rectification means and the power received therefrom by the converter means is DC power.

20. A generation system according to claim 19 wherein:
the second feedback signal represents the DC voltage of the DC power rectified by the rectification means;
the feedback means includes means for feeding-back the engine speed as a third feedback signal; and
the converter means compares the first and third feedback signals and converts the power received from said excitation power source into said excitation power in response to the comparison of the first and third feedback signals.

21. A generation system according to claim 19 wherein:
the first feedback signal represents the rms current of the AC power output of the first polyphase stator system;
the second feedback signal represents the DC current of the DC power rectified by the rectification means;
the feeding means includes means for feeding-back the DC voltage of the DC power rectified by the rectification means as a third feedback signal; and
the converter means converts the power received from the DC bus into said excitation power in response to the first, second and third feedback signals.

22. A generation system according to claim 14 wherein the converter means comprises a pulse width modulation inverter having a logic stage producing a switching control signal in response to the first and second feedback signals, the pulse width modulation inverter also having a power switching stage controlled by the logic stage, the power switching stage receiving and inverting the DC power in response to the switching control signal to produce the excitation power.

23. A generation system according to claim 22 wherein:

the power switching stage comprises a thyristor bridge;
the logic stage comprises thyristor gating logic; and
the switching control signal comprises a plurality of gate signals.

24. A generation system according to claim 22 wherein:
the power switching stage comprises a transistor bridge;
the logic stage comprises transistor base drive signal generation logic; and
the switching control signal comprises a plurality of base drive signals.

25. A method of generation DC power on board a vehicle having a DC bus and propulsion means for propelling the vehicle, comprising the steps of:
equipping the vehicle with an onboard power generation system which includes:
a brushless doubly-fed generator having a rotor with rotor conductors and a stator with stator windings, the stator windings comprising first and second polyphase stator systems, with the rotor mechanically coupled to the propulsion means;
rectification means electrically coupled with the first polyphase stator system of the generator and with the DC bus;
first sensor means electrically located between the first polyphase stator system and the rectification means; and
converter means electrically coupled with an excitation power source, the first sensor means, and the second polyphase stator system of the generator;
driving the generator rotor with a driving force produced by the propulsion means to produce an AC power output in the first polyphase stator system;
sensing a parameter of the AC power output of the first polyphase stator system of the generator with the first sensor means, and producing a first sensor signal in response to the sensed AC power output parameter;
receiving power from the excitation power source with the converter means;
receiving the first sensor signal from the first sensor means with the converter means;
converting power received from the excitation power source into excitation power with the converter means according to the received first sensor signal so as to control the flow of the AC power output from the first polyphase stator system substantially disregarding variations in the driving force of the propulsion means;
delivering the excitation power to the second polyphase stator system of the generator; and
rectifying the AC power output received from the first polyphase stator system into DC power with the rectification means for delivery to the DC bus.

26. A method according to claim 25 wherein:
the excitation power source comprises the DC bus; and
the step of rectifying power from the excitation power source with the converter means comprises receiving DC power from the DC bus.

27. A method according to claim 26 wherein:
the method further includes the step of monitoring the voltage of the DC bus as the DC power is received from the DC bus by the converter means; and the converting step comprises the step of converting the power received from said excitation power source into said excitation power with the converter means according to the monitored voltage of the DC bus.

28. A method according to claim 25 wherein:

the equipping step includes the steps of equipping the vehicle with a power generation system having converter means comprising a regulating inverter; and the converting step includes the step of inverting the DC power received from said excitation power source into said excitation power comprising AC power with the regulating inverter.

29. The method according to claim 25 wherein the equipping step includes the step of equipping the vehicle with a rectification means comprising an uncontrolled rectifier.

30. A method according to claim 25 wherein:

the equipping step includes the step of equipping the vehicle with a power generation system having an excitation power source rectifier electrically coupled with the first polyphase stator system of the generator and with the converter means; and the method further includes the steps of tapping a portion of the AC power produced by the generator first polyphase stator system and rectifying said tapped portion of the AC power with the excitation power source rectifier into DC excitation power, and delivering the rectified DC excitation power to the converter means.

* * * * *